United States Patent Office 3,294,559
Patented Dec. 27, 1966

3,294,559
YELLOW GLASS BEAD COMPOSITIONS
Charles E. Searight, Ezra M. Alexander, and John R. Ryan, Jackson, Miss., and Dominick Labino, Grand Rapids, Ohio, assignors to Cataphote Corporation, Toledo, Ohio, a corporation of Ohio
No Drawing. Filed Apr. 22, 1963, Ser. No. 274,809
14 Claims. (Cl. 106—54)

The present invention relates to novel glass compositions particularly useful for the manufacture of yellow glass beads.

Colorless, low-index glasses have been used previously for the reflectorization of yellow and white traffic paints and the like. The optimum value for index of refraction for glass compositions suitable for making retro-reflective lens elements has been found typically to be from about 1.85 to about 1.95. This optimum value for the index of refraction of the glass elements has been found to give the maximum or optimum combination of angularity and brilliance properties. These properties are most important in terms of light reflection, which is the reason for the use of glass elements in the surface of paints, signs and the like. The reason for the use of low refractive index glass beads in the reflectorization of white and yellow traffic paints is their relatively smaller cost than colorless high refractive index glass beads. For instance, colorless, low refractive index glasses have a raw material cost of typically $20 per ton compared to from about $300 to $500 per ton for the colorless glass beads having an index of refraction of about 1.9. Since the great majority of the traffic paints used today are reflectorized, it would not be economical for the user of these beads to buy the more efficient, optimum glass beads with indices of refraction of about 1.9. The low refractive index glass beads have good angularity but do not have good efficiencies for reflecting light. Most of the incident light is scattered and is not reflected back to the observer.

Another objection of the glass beads used today for reflecting traffic paints and the like is the fact that colorless glass beads, when used to reflectorize a colored traffic marker such as yellow traffic lines used as lane dividers on highways, do not reflect the true color of the yellow lines or stripes. The reason that one does not observe the actual color of a traffic line (other than white lines) is due to the fact that colorless glass beads will reflect white light where the white pigment is adjacent to the embedded glass beads and yellow light where the yellow pigment is adjacent to the glass beads. It would be highly uneconomical to use only yellow pigments since these materials cost from three to six dollars per pound. The result of this combination of reflected light, i.e., reflected white light and reflected yellow light, is in the form of a color change. The white light tends to "wash out" the visual effect of the reflected yellow light. The object reflectorized with colorless glass beads appears to be whitish-yellow colored. The glass beads are considered objectionable as such since users of these glass beads require a reflection of a Federal Yellow color. Heretofore, these yellow traffic stripes or lines have been observed as true Federal Yellow in nature during the day, but not when actuated by incoming light from automobile head lamps at night.

Additionally, glass beads of high index of refraction such as those which are used in traffic signs, having an index of refraction of about 1.9, which cost from about $300 to $500 per ton in raw material cost alone, are also objectionable since the nighttime color is "washed out" by the use of white or colorless glass beads, although this effect is less significant in signs as compared to yellow traffic paints. The reason for this is the higher index of refraction of the sign beads.

Glass compositions prepared within the scope of the present invention overcome the discrepancies of the known glasses by providing glasses which are yellow in color, thereby obviating the necessity for using very expensive pigments in greater concentration to obtain satisfactory color of reflected light falling on or actuating these glass beads at night. The "washing out" effect of colorless glass beads in colored marking indicia has been attributed to various things in the past, such as poor light stability of the pigment, thermal breakdown of the pigment, et cetera. Glass beads produced from compositions of the present invention further overcome high density, specific heat, and low surface tension characteristics present in the known glass compositions. These properties are of utmost importance to users of glass beads for reflectorizing objects. Additionally, glass beads prepared from compositions within the scope of the invention have extremely good chemical and physical durability and structure and other glass bead making properties.

The density of a glass is a measure of the amount of coverage area that can be obtained per unit weight of the glass beads. For instance, the greater the density of a particular glass composition suitable for making glass beads, the less coverage area that can be obtained for a particular size range of glass beads. If the density of a particular glass is 3.0 grams per cubic centimeter this means that, when compared to another glass having a density of 4.0 grams per cubic centimeter, each pound of glass having a density of 3.0 will cover approximately twenty-five percent more area than the glass having the larger density of 4.0. Since area is what is important to the user this represents a great monetary savings.

It presently costs from fifteen to twenty cents per pound in raw material cost alone for glass beads used in traffic signs having an index of refraction of about 1.90; whereas glass compositions of the present invention having a comparable index of refraction and superior glass bead making properties costs from about five to seven cents per pound in raw material costs. Therefore, the glass composition of the invention represents as much as 300 percent savings in raw material cost.

As previously stated, glass beads manufactured from the glass composition of the invention have superior glass bead making properties compared with typical glass compositions of the prior art. Among the more important of these properties are optical clarity, high surface tension, low specific heat, and fluidity. These properties are very important for the manufacturer of glass beads. For example, in the manufacture of glass beads directly from a molten stream of glass, glass fibers and other irregular objects are formed unless the surface tension is extremely high and the glass is fluid at not too excessive temperatures. Nearly as important as surface tension, the specific heat of a glass significantly contributes to the manufacture of glass beads, depending on what the value of the specific heat is for the glass. When a molten stream of glass is atomized, the tiny particles of molten glass are accelerated through a medium such as air. Due to the surface tension of the glass, the molten particles are spherulized. At the same time these same particles are being cooled by the medium through which they are traveling. The surface tension also acts in such a way as to overcome the acceleration of the particles whereby spheres can be obtained instead of irregular objects or fiber. The higher the surface tension, the more readily will glass beads be formed from the molten glass. It is inconceivable that there might be an upper limit with respect to the surface tension of a glass in terms of its suitability for forming glass spheres.

From the point of view of specific heat, the lower the specific heat of a glass the more rapidly will the glass cool to form a sphere. The effect of this is twofold. First, the more rapidly a glass cools, the quicker the glass beads can be collected after they are atomized and, secondly, high titanium and barium glasses are extremely prone to devitrification but if the glass cools quickly enough, vitreous glass beads can be prepared from glass compositions which normally, in terms of large optical elements and similar articles, cannot be prepared in the vitreous state. Usually, glass compositions which give very viscous melts, such as the low index glass beads of the soda-lime-silica type described above do not readily devitrify and can be prepared in large articles such as bottles. In this case, the glass melt is so viscous that the oxides of the melt do not have an opportunity to arrange themselves in an orderly fashion. Should the glass be allowed to arrange itself in an orderly fashion, then the glass would devitrify or crystallize and would be totally unsuitable for use as retro-reflective lens elements.

The specific heat of these viscous glasses is still important in terms of glass bead manufacture and is of unmost importance in terms of glass head manufacture utilizing very fluid glass compositions of the type described in the invention, since the rapid cooling of the glass can be though of as having an effect similar to that of increased viscosity in the case of the more viscous glasses in that the "disorder" is "frozen in" by the rapid cooling of the glass. The connection between specific heat and cooling rate is as follows: Generally, any two bodies will lose heat to the surroundings from a temperature of say $t_2$ to a lower temperature $t_1$ at the same rate. For example, two different glass beads prepared from different glass compositions having different specific heat values are raised to a temperature $t_2$. From this temperature the two beads having the same mass are allowed to cool in the air. After a certain interval of time has elapsed since the beginning of the cooling down of these two glass beads, one would find that the same quantity of heat has been lost by each body. Now, specific heat is a value describing the quantity of heat required to raise one gram of the glass 1° C., and conversely, is a measure of the quantity of heat lost by one gram of glass for each 1° C. decrease in temperature. It can readily be seen that a glass having a specific heat of .13 requires less heat to increase in temperature from $t_1$ to $t_2$ and requires less heat loss per degree fall in temperature when cooling than another glass whose specific heat is .16. The units used here for specific heat are calories/gram/° C. When these two glasses are cooled from the same high temperature to a lower temperature, the glass having the lower specific heat of .13 has cooled 1° C. when each gram of the two glasses has lost .13 calorie of heat. The glass having the specific heat of .16 must lose .03 calorie/gram more, which requires more time, in order to lose 1° C.

It is an object of the invention to produce glass compositions suitable for the manufacture of glass beads having an index of refraction from about 1.6 to about 2.0.

Glass beads prepared from glass compositions of the invention are further characterized by the unexpected result of greatly improved color of yellow objects that are reflectorized by these retro-reflective lens elements. It is a fact that when a glass bead is colored it will not transmit or reflect the same intensity of light as it would were it colorless in nature. However, we have found that the yellow glass beads of the invention are more intense than the colorless one of the prior art having the same index of refraction. This is due to the poor efficiency of the colorless glass bead to reflect the yellow light which, in turn, was due to the lack of adequate concentration of yellow and/or orange pigment in the traffic paint. The glass compositions of the invention include small amounts of an oxide of cerium to impart a higher index of refraction and also to impart a yellow color to the resultant glass beads manufactured therefrom. Smaller amounts of cadmium sulfide may be additionally included in the compositions for these purposes.

The glass compositions which have been found particularly suitable for the manufacture of retro-reflective lens elements to be used in illuminating yellow colored or yellow-orange colored objects, may be broadly described as follows:

The compositions of the invention consist essentially of from about 10% to about 50% by weight of titanium dioxide, from about 10% to about 56% by weight of barium oxide, from about 0.2% to about 30% by weight of silica, from about 0 to about 14% by weight of boric oxide and from about 0.1% to about 1% by weight of cerium oxide. Up to about .05% by weight of cadmium sulfide, up to about 40% by weight of calcium oxide, up to about 14% by weight of sodium oxide, up to about 6% by weight of alumina and up to about 20% by weight of zinc oxide may also be added to the compositions.

Other minor ingredients such as those found in the raw materials used and certain furnace contaminates caused by the slight fluxing action of the glass compositions on the refractory do not deleteriously affect glass compositions of the invention and are to be considered within the scope of the invention.

In Table 1 are representative examples of base compositions, in parts by weight, to which .05% by weight of $Ce_2O_3$, $CeO_2$ or mixtures thereof are added to form the high refractive index yellow glass compositions of the invention. These compositions may also contain up to about .05% by weight of cadmium sulfide.

TABLE 1

| | TiO₂ | BaO | CaO | Na₂O | SiO₂ | B₂O₃ | Al₂O₃ | ZnO | Refractive Index | Density |
|---|---|---|---|---|---|---|---|---|---|---|
| 1 | 20 | 20 | 5 | 10 | 25 | 9.5 | | 10.5 | 1.68 | 3.2 |
| 2 | 10 | 14 | 5 | 10 | 15 | 9.5 | | 10.5 | 1.68 | 3.7 |
| 3 | 20 | 15 | 30 | 4 | 30 | 0.5 | 0.5 | | 1.77 | 3.5 |
| 4 | 15 | 10 | 40 | 4 | 30 | 0.5 | 0.5 | | 1.76 | 3.4 |
| 5 | 20 | 35 | 20 | 4 | 20 | 0.5 | 0.5 | | 1.81 | 3.0 |
| 6 | 10 | 50 | 5 | 5.5 | 20 | 9.5 | | | 1.69 | 3.7 |
| 7 | 20 | 20 | 5 | 14 | 30 | 9.5 | | 1.5 | 1.66 | 3.1 |
| 8 | 25 | 25 | 30 | 4 | 15 | 0.5 | 0.5 | | 1.84 | 3.8 |
| 9 | 25 | 35 | 20 | 2 | 16 | 2 | | | 1.83 | 3.8 |
| 10 | 25 | 35 | 20 | 0.5 | 17 | 1.5 | 2.0 | | 1.83 | 3.9 |
| 11 | 25 | 15 | 40 | 14 | 5 | 0.5 | 0.5 | | 1.81 | 3.4 |
| 12 | 25 | 35 | 10 | 0.5 | 14 | 5.5 | | 10 | 1.79 | 3.6 |
| 13 | 15 | 45 | 5 | 2 | 14 | 14 | 2 | 3 | 1.67 | 3.2 |
| 14 | 22.6 | 38.9 | 11.1 | 4.4 | 22.8 | 0.6 | 0.6 | | 1.81 | 4.0 |
| 15 | 36 | 42 | 5 | 1 | 12 | 1 | | 3 | 1.89 | 3.9 |
| 16 | 14 | 14.5 | | 12.0 | 30 | 9.5 | | 20 | 1.64 | 3.2 |
| 17 | 20 | 30 | 19 | 2 | 20 | 2 | | | 1.77 | 3.7 |
| 18 | 37 | 30.5 | 5 | 1.5 | 11 | | | 15 | 1.90 | 4.2 |
| 19 | 39 | 28 | 6 | 1 | 9 | 1 | | 16 | 1.90 | 4.1 |
| 20 | 48 | 35 | 7 | | 5 | 1 | | 4 | 1.95 | 4.1 |
| 21 | 32 | 48 | 3 | 2 | 13 | 2 | | | 1.87 | 4.3 |
| 22 | 30 | 48 | 3 | 1 | 13 | 4 | 0.5 | 0.5 | 1.85 | 4.2 |
| 23 | 28 | 50 | 3 | 1 | 13 | 4 | 0.5 | 0.5 | 1.85 | 4.3 |
| 24 | 28 | 52 | 3 | 1 | 11 | 3 | 1 | 1 | 1.86 | 4.4 |
| 25 | 30 | 45 | 3 | 1 | 11 | 3 | 1 | 6 | 1.86 | 4.3 |
| 26 | 30 | 40 | 3 | 1 | 13 | 1 | 1 | 11 | 1.87 | 4.3 |
| 27 | 26 | 53 | 3 | 2 | 13 | 2 | | 1 | 1.86 | 4.5 |
| 28 | 24 | 56 | 3 | 2 | 10 | 2 | 2 | 1 | 1.87 | 4.7 |
| 29 | 20 | 56 | 3 | 2 | 10 | 3 | | 6 | 1.85 | 4.7 |
| 30 | 34.5 | 47 | 4 | 0.5 | 11.5 | 2 | | 0.5 | 1.92 | 4.2 |
| 31 | 35 | 45 | 2 | 0.5 | 11.5 | 1 | | 5 | 1.93 | 4.3 |
| 32 | 44 | 38.8 | 7 | 0.2 | 5 | 1 | | 4 | 1.95 | 4.1 |

Obvious modifications of glass compositions of the invention can be made in some instances without deleteriously affecting the more important properties of the glass as those skilled in the art will observe. However, such modification that is obvious to be considered as falling within the scope of the invention. For instance, a quantity, i.e., up to about one-third or less of the titanium dioxide present, of zirconium dioxide can be substituted for titanium dioxide without appreciably affecting the glass. These compositions normally will not dissolve very much zirconium dioxide and still remain vitreous in nature and therefore it is preferably not used. Lead oxide may also be utilized in these glass compositions but the density will be increased appreciably when lead oxide is used although other properties might be improved such as a reduction in the melting or fusing temperature of the glasses, et cetera. However, lead oxide is preferably deleted from glass compositions of the invention since the atmosphere in many areas of the country contain sulfide fumes which darken or blacken glass compositions containing lead oxide. Lead oxide would be satisfactory and falls within the scope of the invention if a top-coating of a weatherproof polymer is used to protect the glass beads from contact with the sulfide fumes. Other similar modifications can be made as will be obvious to those skilled in the art.

Table 2 is a comparison of typical examples of the prior art in direct comparison with some preferred embodiments of the present invention which clearly show the disadvantages of the prior art and how glass compositions of the present invention overcome these discrepancies.

TABLE 2

| | Specific Heat (cal./gm./° C.) | Surface Tension (dynes/cm. at 900° C.) |
|---|---|---|
| Prior Art Example | .161 | 291 |
| Example 12 of Table 1 | .128 | 352 |
| Example 17 of Table 1 | .120 | 377 |

The composition in mol percent of Prior Art Example above is as follows:

| | Percent |
|---|---|
| Titanium dioxide | 42.0 |
| Barium oxide | 35.1 |
| Boric oxide | 10.4 |
| Zinc oxide | 12.4 |

It will be noted that there is a significant increase in surface tension of the above examples of the invention over the prior art. Some prior art glasses have surface tensions approaching 315 dynes/cm., however, these glasses are usually viscous and not suitable for glass bead manufacture and/or have very high specific heat values.

The glass compositions of Prior Art Example above require from about 21 to about 26 percent more fuel to melt this glass as compared with Examples 12 and 17. For example, these glasses melt in the neighborhood of about 1200 to 1300° C. The prior art example above requires 146,200 cal./ton/° C. whereas Examples 12 and 17 require 116,300 and 109,000 cal./ton/° C. respectively.

The glass compositions of the invention may be prepared by melting a mix of the batch components in a conventional glass furnace made of conventional heat resistant refractories free from deleterious contaminating material. The batch is composed of oxides or compounds decomposable to oxides under the conditions of melting in the proper proportion to yield the specific compositions. In general, titanium, aluminum, and zinc are added as oxides; barium is added in whole or in part as the peroxide, the remainder as oxide or carbonate; cerium is added as $Ce_2O_3$, $CeO_2$ or mixtures thereof; calcium and sodium may be added as carbonates; silica may be added as high grade quartz sand; boron may be added as boric acid; and cadmium is added as a sulfide.

The glass compositions of the invention melt at temperatures within the range of 1100–1400° C. The batch mix is preferably added to the furnace continuously, or in successive increments allowing each increment to melt before the next increment is added, until the glass melt is brought to the desired level which may require from 4 to 10 hours.

After the melt has been prepared, it can be converted to glass beads by conventional methods, either directly from the melt or by pouring a stream of the molten glass into water to form cullet, particles of which are blown or dropped through a high temperature flame or a radiant heating zone to soften them sufficiently to form spheres by the action of surface tension followed by rapid cooling to harden the spheres without devitrification.

We claim:
1. A high refractive index yellow glass consisting essentially of a vitreous composition of from about 10% to about 50% by weight of titanium dioxide, from about

10% to about 56% by weight of barium oxide, from about 0.2% to about 30% by weight of silica, from about 0.5% to about 14% by weight of boric oxide, and from about .01% to about 1% by weight of cerium oxide.

2. A high refractive index yellow glass composition as defined in claim 1 containing up to about .05% by weight of cadmium sulfide.

3. A high refractive index yellow glass composition as defined in claim 1 containing up to about 40% by weight of calcium oxide.

4. A high refractive index yellow glass composition as defined in claim 1 containing up to about 14% by weight of sodium oxide.

5. A high refractive index yellow glass composition as defined in claim 1 containing up to about 6% by weight of alumina.

6. A high refractive index yellow glass composition as defined in claim 1 containing up to about 20% by weight of zinc oxide.

7. A high refractive index yellow glass composition consisting essentially by weight:

|  | Percent |
|---|---|
| $TiO_2$ | 20 |
| BaO | 15 |
| CaO | 30 |
| $Na_2O$ | 4 |
| $SiO_2$ | 30 |
| $B_2O_3$ | 0.5 |
| $Al_2O_3$ | 0.5 | and containing about .05% by weight of cerium oxide.

8. A high refractive index yellow glass composition consisting essentially by weight:

|  | Percent |
|---|---|
| $TiO_2$ | 15 |
| BaO | 10 |
| CaO | 40 |
| $Na_2O$ | 4 |
| $SiO_2$ | 30 |
| $B_2O_3$ | 0.5 |
| $Al_2O_3$ | 0.5 | and containing about .05% by weight of cerium oxide.

9. A high refractive index yellow glass composition consisting essentially by weight:

|  | Percent |
|---|---|
| $TiO_2$ | 20 |
| BaO | 35 |
| CaO | 20 |
| $Na_2O$ | 4 |
| $SiO_2$ | 20 |
| $B_2O_3$ | 0.5 |
| $Al_2O_3$ | 0.5 | and containing about .05% by weight of cerium oxide.

10. A high refractive index yellow glass composition consisting essentially by weight:

|  | Percent |
|---|---|
| $TiO_2$ | 20 |
| BaO | 20 |
| CaO | 5 |
| $Na_2O$ | 14 |
| $SiO_2$ | 30 |
| $B_2O_3$ | 9.5 |
| ZnO | 1.5 | and containing about .05% by weight of cerium oxide.

11. A high refractive index yellow glass composition consisting essentially by weight:

|  | Percent |
|---|---|
| $TiO_2$ | 32 |
| BaO | 48 |
| CaO | 3 |
| $Na_2O$ | 2 |
| $SiO_2$ | 13 |
| $B_2O_3$ | 2 | and containing about .05% by weight of cerium oxide.

12. A high refractive index yellow glass compostion consisting essentially by weight:

|  | Percent |
|---|---|
| $TiO_2$ | 34.5 |
| BaO | 47 |
| CaO | 4 |
| $Na_2O$ | 0.5 |
| $SiO_2$ | 11.5 |
| $B_2O_3$ | 2 |
| ZnO | 0.5 | and containing about .05% by weight of cerium oxide.

13. A high refractive index yellow glass composition consisting essentially by weight:

|  | Percent |
|---|---|
| $TiO_2$ | 35 |
| BaO | 45 |
| CaO | 2 |
| $Na_2O$ | 0.5 |
| $SiO_2$ | 11.5 |
| $B_2O_3$ | 1 |
| ZnO | 5 | and containing about .05% by weight of cerium oxide.

14. A high refractive index yellow glass composition consisting essentially by weight:

|  | Percent |
|---|---|
| $TiO_2$ | 44 |
| BaO | 38.8 |
| CaO | 7 |
| $Na_2O$ | 0.2 |
| $SiO_2$ | 5 |
| $B_2O_3$ | 1 |
| ZnO | 4 | and containing about .05% by weight of cerium oxide.

References Cited by the Examiner

UNITED STATES PATENTS

| 2,924,636 | 2/1960 | Broderick et al. | 106—54 |
| 2,939,797 | 6/1960 | Rindone | 106—47 |
| 3,193,401 | 7/1965 | Alexander et al. | 106—54 |

FOREIGN PATENTS 719,067  11/1931  France.

HELEN M. McCARTHY, *Acting Primary Examiner.*